United States Patent [19]

Ettlin

[11] Patent Number: 5,265,893

[45] Date of Patent: Nov. 30, 1993

[54] GROCERY CART SHELF

[76] Inventor: Jerome L. Ettlin, 3936 Setonhurst Rd., Baltimore, Md. 21208

[21] Appl. No.: 13,779

[22] Filed: Feb. 5, 1993

[51] Int. Cl.⁵ ............................................. B62B 3/02
[52] U.S. Cl. ................................. 280/33.992; 108/90
[58] Field of Search .................... 280/33.992, 33.991, 280/DIG. 4; 108/44, 115, 116, 50, 90, 42; 312/258

[56] References Cited

U.S. PATENT DOCUMENTS

| | | | |
|---|---|---|---|
| 4,487,134 | 12/1984 | Foote | 280/33.992 |
| 4,679,818 | 7/1987 | Kakavas | 280/33.992 |
| 4,901,901 | 2/1990 | Reitenour | 280/33.992 |
| 5,004,252 | 4/1991 | Kraper | 280/33.992 |

Primary Examiner—Richard M. Camby
Attorney, Agent, or Firm—Peter Gibson

[57] ABSTRACT

The present invention comprises a substantially planar, rigid structure intended to provide a removable, horizontal division of the interior of a four wheeled wire frame grocery cart. A flat, rigid structure, dimensioned for the particular manufacture of cart, possesses a member for obtaining support from at least one of the several pairs of opposed longitudinal bars found in the standard wire frame cart construction. The member enables positioning of the shelf by abutment of one side of said shelf against one interior side of the cart while holding the opposed side of the shelf from a position above the level of abutment and then simply releasing. The standard construction of a four wheeled wire frame cart employs a constant interior dimension between side walls along with several substantially linear, horizontal pairs of opposed frame members. This construction enables an appropriately sized shelf to be positioned in any one of several vertical heights predetermined by the placement of the horizontal frame members. A handle is suggested to assist in removal and insertion and may be combined with a member for hanging the shelf from a top edge of the cart down along an exterior side surface for convenient storage prior deployment.

20 Claims, 3 Drawing Sheets

GROCERY CART SHELF

BACKGROUND OF THE INVENTION

Large grocery stores of the type commonly found in American metropolitan areas have many features in common. One such feature is the employment of four wheeled wire frame cart provided for customer use in shopping. These carts vary in specific dimensions, according to manufacturer, but all possess an overwhelming similarity in construction which permits horizontal nesting of carts in a linear array. Another common feature of these supermarkets is in the arrangement of the various departments which vary little in composition. Inevitably, the produce department is encountered first in the normal traffic pattern encouraged by the layout of these stores. Following the perimeter of the typical store, meats are often encountered next, then the baked goods or dairy products, a deli section, fresh seafood. The interior of the market, which is often traversed last, is comprised of aisles of shelving storing the non perishable goods, canned food, bulk items, et cetera.

It is a necessary if not sufficient condition of horizontally nesting four wheeled wire frame carts that the interior of the cart be unobstructed so that the front of one may fit into another via the hinged rear panel. Any horizontal division of the interior of the cart is thus effectively prohibited. Having obtained the use of one such cart, the shopper typically encounters perishable foods first: fruits and vegetables if not baked goods and dairy products, ahead of the heavier and generally more rigid items such as canned goods, beverages, detergents, etc. Having placed the perishable goods in the cart first, the customer is faced with positioning the latter items in the cart without crushing the perishable goods. This may indeed occasion exercise of the shopper's ingenuity but it also occasions pure inconvenience: it is necessary to remove the perishable items placed first in the cart and replace the same goods back upon the heavier and more rigid goods encountered later.

The arena of improvements concerned with grocery carts is not vacant. Many devices for the holding of grocery lists, advertisements and other paraphernalia are found in the form of U.S. patents, all in conjunction with the standard construction four wheeled wire frame grocery cart. A vertical pivoted divider has been patented. A shelf intended to fit on the handle of these carts has been patented. A special bag fitting in the cart has been patented. A collapsible horizontal shelf with an adjustable vertical height regulated by means of a chain and pulley has been patented, but never sold, to the applicant's knowledge. And, finally, a plastic tray fitting under the basket of a cart, directly above the wheels, has been disclosed by a U.S. patent. Among all these contrivances and contraptions, there exists no means whatsoever for obtaining a horizontal division of the basket interior of a standard four wheeled wire frame grocery cart that provides a simple and convenient means of protecting a lower level of perishables in the cart from the crush of bulk items placed above.

SUMMARY OF THE INVENTION

The purpose of the present invention is a simple device providing a convenient means of effecting a rigid, horizontal division of the interior of the basket of standard four wheeled wire frame grocery cart possessing means of obtaining support from the horizontal frame members of the cart. The device comprises a substantially planar, rigid structure possessing a perimeter subtended by the interior perimeter of a particular manufacture of grocery cart constructed with attached means of support. A preferred embodiment of the principles relating to the present invention possesses a plurality of projections extending beyond a first linear edge of the main body of the shelf and at least one projection extending beyond an opposed, substantially parallel, second linear edge of the main body of the shelf.

This construction enables a simple two step deployment of the shelf: (1) said first linear edge possessing a plurality of projections is biased against one interior side of the cart basket, disposed such that said projections are in communication with the upper surface of a first horizontal cart frame member, (2) said opposed second linear edge of the shelf is lowered to a single elevation with said first linear edge which is found by at least one said projection extending beyond said second linear edge obtaining communication with the upper surface of a second horizontal cart frame member opposed to the first.

Other embodiments of the principles relating to the present invention encompass the possession of an arcuate portion by at least one said projection, a wire grid construction, provision for pivoted attachment of the shelf to the cart frame and the possession of means of removable attachment of the shelf in a vertical position to one of the horizontal cart frame members such that the shelf hangs substantially flush to an exterior vertical surface of the cart basket.

DETAILED DESCRIPTION OF THE INVENTION

Figure 1:
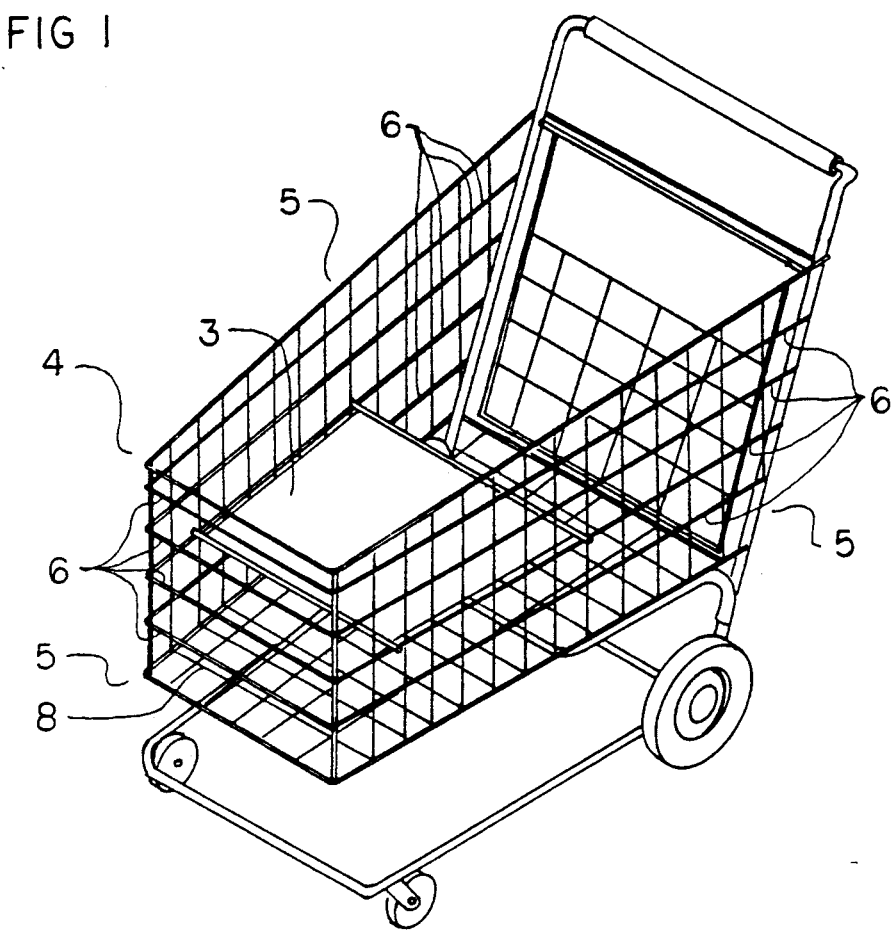
FIG. 1 is a perspective view of a standard four wheeled wire frame grocery cart depicting deployment of a preferred embodiment of the present invention.

FIG. 1 illustrates a preferred embodiment of the present invention deployed in a standard four wheeled wire frame grocery cart possessing a cart basket 4. The shelf is maintained in a horizontal position in the cart basket interior by support means which are comprised of projections 7 extending beyond the exterior perimeter of the main body 3 of the shelf which are resting upon horizontal frame members 6 of the cart. The main body 3 of the shelf possesses an exterior perimeter which is subtended by the interior cart perimeter. In this preferred embodiment, the support means comprises at least two projections 7 extending beyond a first linear edge 1 of the main body 3 of the shelf and at least one projection 7 extending beyond a second linear edge of the main body 3 of the shelf.

Figure 2:
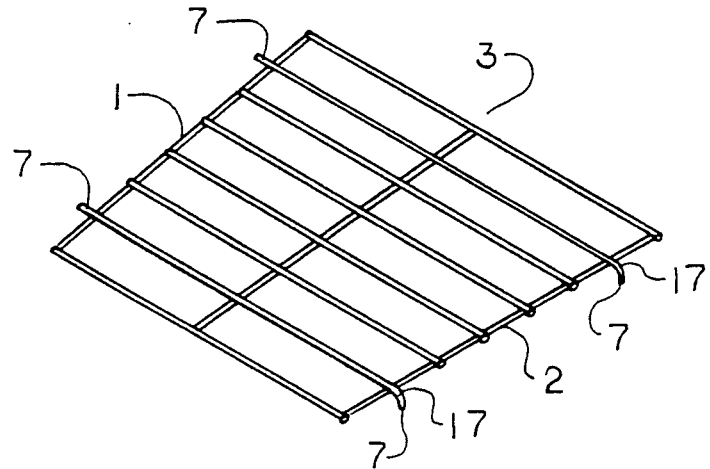
FIG. 2 is a perspective view illustrating a first preferred embodiment of the principles of the present invention in regard particularly to construction in heavy gauge wire.

The main body 3 of the shelf comprises a substantially planar, rigid structure upon which goods purchased in a grocery store, or supermarket, are expected to be found for purchase. While the main body 3 illustrated in FIG. 1 is solid, a first preferred embodiment of the principles relating to the present invention, as illustrated in FIG. 2, is constructed of heavy gauge wire, exactly similar to the construction of standard grocery carts. Strength and durability of this construction recommend its use but the principles relating to the present invention certainly do not demand this material. It is paramount that the structure possess sufficient rigidity to withstand the weight of articles found in a grocery store and protect other goods placed below the shelf from the crush of these articles.

The shelf illustrated in FIG. 2 depicts the preferred embodiment of the means of support. A pair of projections 7 is seen upon either side of the main body 3 of the shelf and the pair extending beyond a second linear edge 2 possess an arcuate portion 17 which servers an obvious function in stabilizing the shelf in deployment upon the opposed horizontal frame members 6 of the grocery cart basket 4. Curving the projections 7 also minimizes the possibility of these projections from posing the opportunity of harm or danger to material or persons. While the projections 7 depicted in FIG. 1 lack an arcuate portion, as do the projections 7 extending beyond first linear edge 1 of the shelf illustrated in FIG. 2, one pair of projections extending from each of the two opposed sides of the shelf are seen, as in FIG. 2 which exemplifies the basic structure of the means of support considered most stable and convenient in fulfillment of the principles relating to the present invention.

It is noted that the prevalent construction of grocery carts in the United States is currently characterized not only by four wheels and a wire frame but also by the ability to horizontally nest a number of carts, front through back, so that the floor space required for storage of a number of such carts is minimized. In order to facilitate this feature, the vertical walls 5 of such carts are substantially parallel but must necessarily possess a small inclination from back to front such that the front wall of the cart is of a smaller width than the rear. For the purpose of clarity in this document, it is hereby noted that the phrase 'substantially parallel' as applied to either the vertical walls 5 of a grocery cart basket or to the opposed first and second linear edges 1 and 2 of the main body 3 of the shelf representing the present invention specifically encompass a small degree of inclination with respect to the longitudinal axis of each.

A further feature characterizing the standard design of grocery carts currently prevalent in the United States today are side walls which are, indeed, vertical. While this is not necessary for horizontal nesting, it does maximize the space of a basket interior with regard to material, though other factors may certainly be involved. Regardless of the reason for this feature, and though it is unnecessary to the present invention, vertical walls allow an additional advantage to a horizontal shelf. Given truly vertical side walls, a shelf constructed in accordance with the first preferred embodiment of the principles relating to the present invention for a particular manufacture of cart may be positioned upon several vertical levels inside the basket of the cart. Given vertical side walls, the distance between any two opposed horizontal frame members upon a single vertical elevation is the same, and the distance between any two opposed horizontal frame members upon different vertical elevations is greater.

Therefore, it is eminently practical, therefore, to place the first linear edge of a shelf made in accordance with a first preferred embodiment of the principles relating to the present invention in communication with one interior side wall of a grocery cart of a particular manufacture and ensure that the projections extending beyond the first linear edge of the main body of the shelf will find repose upon the upper surface of one horizontal frame member. Then, by simply dropping the opposed side of the shelf, it is inevitable that the projections extending beyond the second linear edge of the main body of the shelf will engage the horizontal frame member along the opposed side wall of the cart which is upon the same vertical elevation as the first horizontal member engaged, and no other, if the projections are of correct length. Obviously, if the projections exceed the difference between the horizontal interior width of the cart and the distance between one horizontal frame member upon one vertical elevation and another upon a different elevation, this feature is thwarted.

Figure 3:
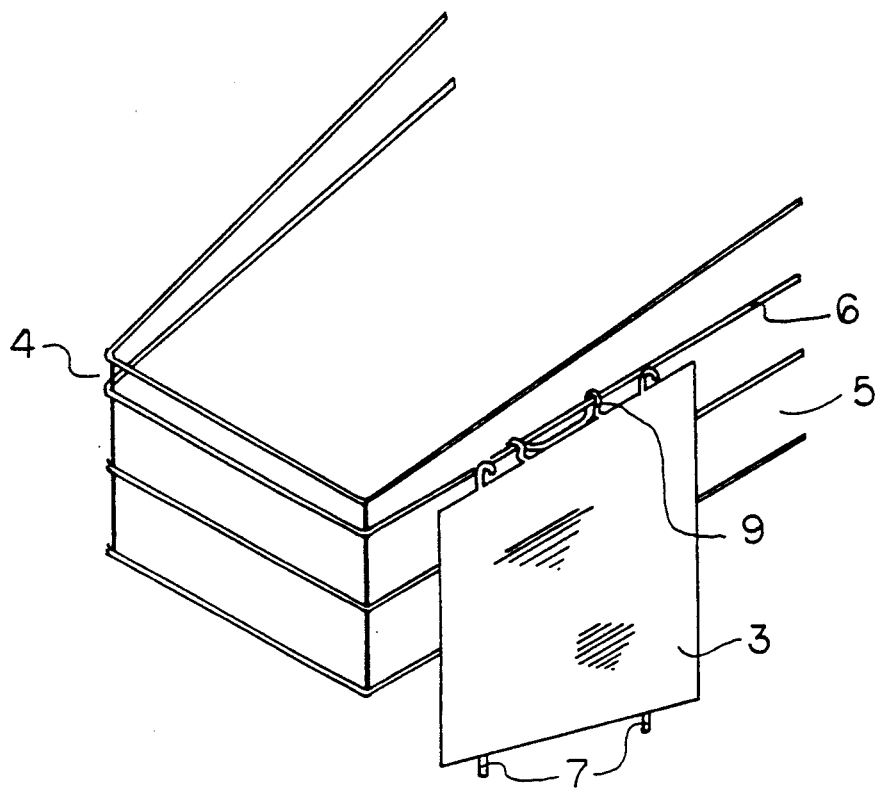
FIG. 3 is a partial perspective view of a grocery cart depicting a preferred embodiment of the present invention shown hanging vertically exterior to a grocery cart side wall.

Another feature of a first preferred embodiment of the principles relating to the present invention is depicted in FIG. 3. The horizontal nesting character of the standard grocery cart precludes the permanent placement of a horizontal shelf. It is desirable, in any case, to have such a shelf removed from the interior of a cart basket while placing goods, particularly perishable goods such as fruits and vegetables, upon the floor of the cart basket prior deployment of the shelf in order to support heavier bulk items safely above the perishable goods. While unessential to the present invention, another recommended feature is the inclusion of a handle providing the means to hang the shelf, prior use, from a horizontal frame member, including the top edge which is not generally strictly horizontal but is substantially so, exterior to the basket substantially flush to one of the cart side walls. A handle 9 for this purpose possesses at least one arcuate portion designed to communicate with a substantially horizontal frame member and is fixedly attached to the main body 3 of the shelf.

This handle may also, if designed appropriately, serve to provide a convenient location for the placement of one's fingers when either placing the shelf into position in the interior of a cart basket or removal therefrom. Emphasis of this feature will minimize the possibility of one catching one's fingers between a linear edge of the main body of the shelf and an interior side wall of the cart basket. A separate handle may be provided for this function in keeping with the principles of the present invention. It is simply considered most economic to combine these two purposes, that of a handle for deployment and removal and that of a hook for hanging the shelf along an exterior side wall of the cart prior use, in one attachment.

While the foregoing describes in detail a first preferred embodiment of principles relating to the present invention as well as the use thereof, other versions, in both structure and use, are contemplated without variance from said principles. It is noted, first of all, that stability in the support of a horizontal structure demands three points. While two pairs have been discussed, it is entirely reasonable to omit one projection, so long as the midpoint of a first linear edge is between two points of support, or projections extending beyond that edge, while a single projection is employed in extension beyond the opposed edge.

Figure 4:
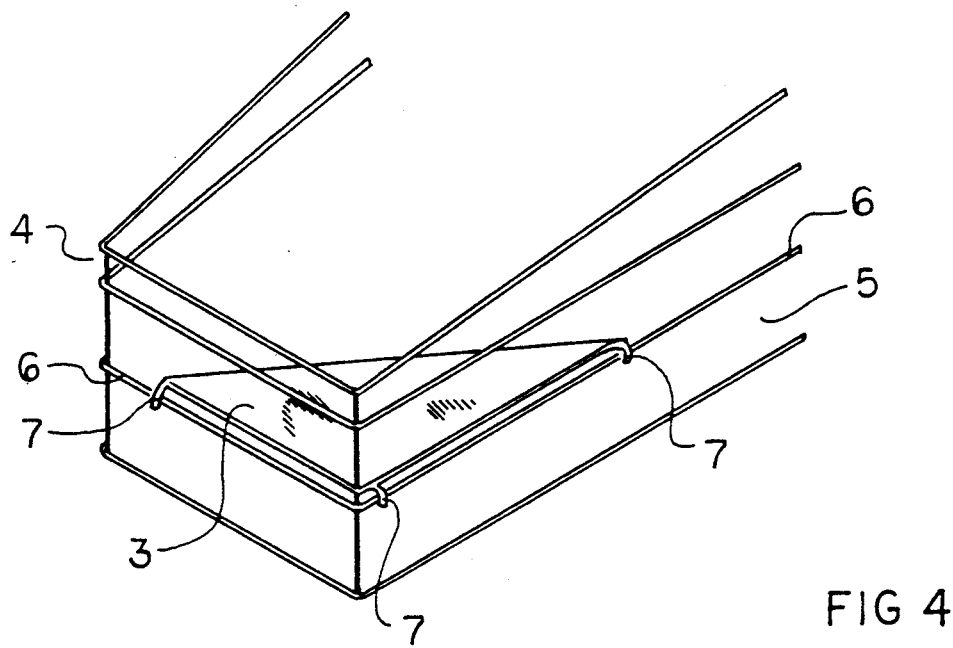
FIG. 4 is a partial perspective view of a grocery cart depicting a second preferred embodiment of the present invention illustrating support means utilizing adjacent horizontal frame members.

Nor is it necessary to support the shelf along opposed sides. As illustrated in FIG. 4, adjacent sides of the standard grocery cart by horizontal frame members upon a single vertical elevation is quite practical. In this case, naturally, at least one projection 7, or means of support, is necessary extending from the perimeter, or along adjacent sides, of the main body 3 of the shelf. A triangular configuration is depicted as the simplest illustration of a structure adhering to this embodiment of the principle relating to the present invention, but any configuration possessing horizontal balance will suffice. It is also noted that the perimeter of any structure in adherence to the principles of the present invention need not be straight, or linear, but this is considered the most efficacious for the intended purpose of the current invention.

Figure 5:
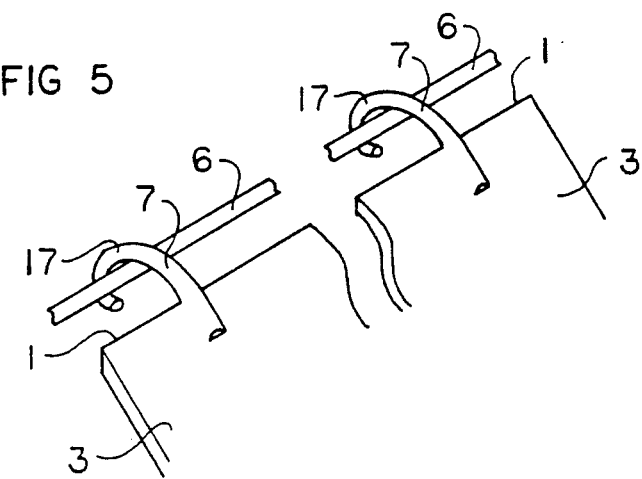
FIG. 5 is a partial perspective view of a feature in accordance with the principles relating to the present invention illustrating support means providing pivotable attachment to a horizontal frame member.

Similarly, while it is considered best to construct a shelf which is fully removable from a grocery cart, there are at least two configurations possible which admit of an attached shelf which would not inhibit unduly the horizontally nesting character of the standard design of grocery carts prevalent in the United States today. Specifically, a shelf may be attached to a horizontal frame member 6 along either a side or the front vertical wall of such a cart. This attachment is illustrated in FIG. 5 wherein at least one and preferably two projections 7 extending beyond the perimeter of the main body 3 of the shelf possess an arcuate portion 17 of appropriate radius and sufficient length to engage a rod comprising a horizontal frame member 6 along either a side or the front vertical wall of a standard grocery cart. In this case, it is considered that the front wall is preferred over a side wall in deference to the horizontally nesting character of these carts, however, either deployment is equivalent in regard to the principles relating to the present invention.

Figure 6:
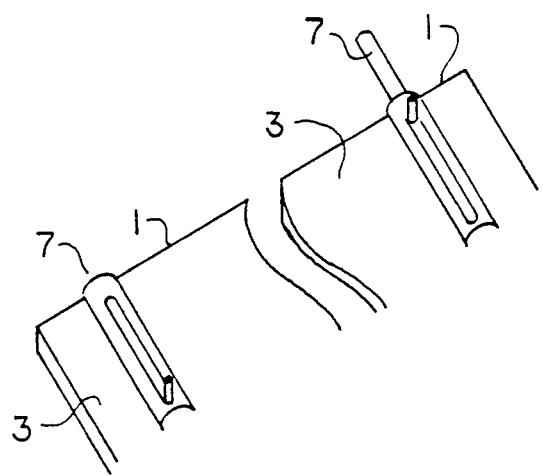
FIG. 6 is a partial perspective view of a feature in accordance with the principles relating to the present invention illustrating support means which are linearly extensible.

If a shelf in accordance with the present invention is attached by means providing a pivot about a horizontal frame member of the cart basket, as illustrated in FIG. 5, it is furthermore considered advantageous that the means of support attached to the opposed side or end of the pivot be extensible and or retractable. A linearly extensible and or retractable projection 7 fulfilling such a requirement of such support means is illustrated in FIG. 6. If this construction is employed for a shelf possessing pivotable attachment to a side wall, the direction of linear extension or retraction is directly opposed to the direction of the projection(s) 7 possessing an arcuate portion 17 suitable for attachment to a horizontal frame member 6. If this feature is employed upon a shelf attached pivotally to the front wall of a cart basket, the direction of extension or retraction is substantially perpendicular to that of the projection(s) pivotally attached to a horizontal member along the front vertical wall of the cart basket.

It is noted in connection with this feature that pivotally attachment to a horizontal member along a vertical cart basket wall need not be permanent but may be removable as well, as explicitly shown in FIG. 5 and either construction adheres to the principles relating to the present invention.

Figure 7:
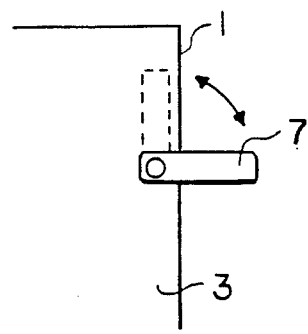
FIG. 7 is a top view of a feature in accordance with the principles relating to the present invention illustrating support means which are rotatable extensible.

Similarly, extension of such means of support opposed to the pivotable attachment of the shelf to a horizontal frame member 6 may be rotatable, as illustrated in FIG. 7. Given a suitable point of attachment to the main body of the shelf, the projection shown here may be rotated inside the exterior perimeter, shown here partially with a first linear edge 1, of the main body 3 to facilitate positioning of the shelf and rotated outward, beyond the perimeter of the main body in order to rest upon and in communication with the upper surface of a horizontal frame member in order to provide the shelf with means of support.

Figure 8:
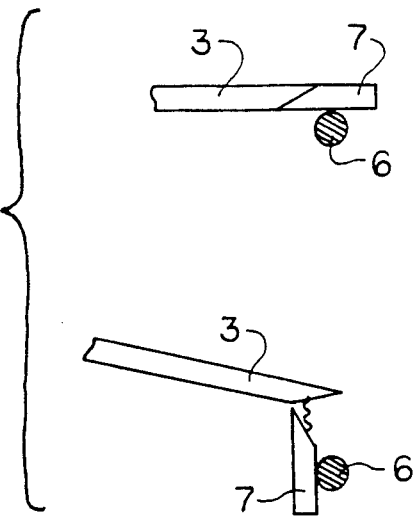
FIG. 8 is a side view of a feature in accordance with the principles relating to the present invention illustrating support means which are resiliently extensible.

FIG. 8 illustrates a third method of construction of a projection which will facilitate the deployment of a shelf pivotally attached to a horizontal frame member. The projection 7 here depicted possesses a resilience sufficient to permit the projection to pass a horizontal frame member 6 by deflection when positioning the shelf and sufficient rigidity to uphold the load expected during use. In fulfillment of this particular embodiment, it is recommended that a directional resilience opposed to a locking rigidity be practiced. Tension spring loading of the projection in a linear direction combined with a pivot permitting vertical displacement, or deflection of the projection, is suggested. In hitting the bottom surface of a horizontal member the directional pivot would effect an extension of the spring and release of the linear lock while contact with the upper surface of a horizontal frame member by the opposite, bottom, surface of the projection would effect the locked position.

The preferred method of construction of the main body of the shelf, and of the means of support in the first preferred embodiment of the principles relating to the present invention, is that of a heavy gauge wire grid, similar to that of the standard grocery cart, as mentioned above. Alternately, a solid body of plastic or any other material providing a rigid, substantially planar main body is entirely in keeping with said principles. The fixedly attached projections depicted in FIGS. 1-3 and 5, as well as the handle depicted in FIG. 3, are also preferably constructed in a heavy gauge wire. If an extensible projection is utilized, the routenier can easily devise an appropriate construction of suitable materials. Obviously, wire is preferred also for any projection providing means of pivotable attachment. Construction of a grid in heavy gauge wire is normally by standard forming and welding techniques well known to those practiced in the art and no variation from these methods is suggested.

The foregoing discussion is descriptive in character of the principles relating to the present invention and is not to be construed as being in any way restrictive of the rights and privileges pertaining to a grant of Letters Patent for which I hereby claim:

1. A shelf intended for use in a particular manufacture of a standard four wheeled wire frame horizontally nesting grocery cart possessing a plurality of horizontal frame members upon a single vertical elevation each disposed along one of a plurality of vertical cart basket walls, said shelf comprising a main body and support means;

said main body comprising a rigid, substantially planar structure possessing an exterior perimeter subtended by the dimensions of the interior perimeter upon a single vertical elevation of the basket of said particular manufacture of a standard grocery cart;

said support means comprising at least three projections each extending outwardly from said main body beyond said exterior perimeter, terminating in an end distal said main body such that at least one of said projections may be disposed upon and in communication with one of said plurality of horizontal frame members and another of said projections may be disposed upon and in communication with another of said plurality of horizontal frame members, both upon a single vertical elevation;

said shelf thus possessing the capability of being positioned horizontally within a particular manufacture of grocery cart and being supported via said support means by at least two said horizontal frame members, such deployment of said shelf providing a horizontal division of a portion of said grocery cart basket interior and a horizontal surface upon which goods may be placed possessing an elevation within said basket interior above and other than the floor of said basket.

2. A shelf in accordance with claim 1 wherein at least two of said projections extending beyond said exterior main body perimeter are disposed such that one said projection may rest upon and in communication with one said horizontal frame member along a first vertical wall and the other said projection may rest upon and in communication with one said horizontal frame member along a second vertical cart wall disposed adjacent to said first vertical wall.

3. A shelf in accordance with claim 1 wherein at least two of said projections extending beyond said exterior main body perimeter are disposed such that one said projection may rest upon and in communication with one said horizontal frame member along a first vertical wall and the other said projection may rest upon and in communication with one said horizontal frame member among a second vertical cart wall disposed opposite said first vertical wall.

4. A shelf in accordance with claim 1 wherein at least one said projection extending beyond said exterior perimeter possesses an arcuate portion.

5. A shelf in accordance with claim 1 wherein at least one projection extending in a direction possessing a substantial inclination with the plane of said main body and possessing at least one arcuate portion is attached to said main body for the purpose of removable communication with at least one said horizontal frame member of said standard grocery cart allowing said shelf to be hung in a vertical disposition substantially flush an exterior vertical side of said cart basket.

6. A shelf in accordance with claim 1 wherein two said projections extending beyond said exterior perimeter of said main body possess an arcuate portion of a suitable radius and sufficient length of curvature to comprise means of rotatable attachment to one said horizontal frame member such that said shelf possesses a pivot about said one horizontal frame member.

7. A shelf intended for use in a particular manufacture of a standard four wheeled wire frame horizontally nesting grocery cart possessing a plurality of vertically spaced pairs of horizontal frame members, each comprising two horizontal frame members disposed in substantially parallel opposition at a single vertical elevation, one member each along one of the two opposed interior side walls of the cart basket, said shelf comprising a main body and support means;

said main body comprising a rigid, substantially planar structure possessing first and second linear edges disposed in substantially parallel opposition and spaced apart by a body width measuring less than the interior width of the basket of a particular manufacture of grocery cart;

said support means comprising a plurality of projections each extending outwardly from said main body a substantially equal first distance beyond said first linear edge and at least one projection extending outwardly from said main body a second distance beyond said second linear edge, said plurality of projections being spaced apart from each other such that the midpoint of said first linear edge lies between two of said plurality of projections, each said projection further being rigidly attached to and terminating in an end distal said main body;

the sum of said first distance and said second distance exceeding the difference between said interior basket width and said body width thus enabling each of at least three said projections to rest upon and in communication with one said horizontal frame member of one of said plurality of vertically spaced pairs of horizontal frame members at a single vertical elevation supporting said main body in a horizontal position between said one pair of horizontal frame members.

8. A shelf in accordance with claim 7 wherein at least one of said plurality of projections extending beyond said first linear edge possesses an arcuate portion.

9. A shelf in accordance with claim 7 wherein at least one said projection extending beyond said second linear edge possesses an arcuate portion.

10. A shelf in accordance with claim 7 wherein at least one projection extending in a direction possessing a substantial inclination with the plane of said main body and possessing at least one arcuate portion is attached to said main body for the purpose of removable communication with at least one said horizontal frame member of said grocery cart basket allowing said shelf to be hung in a vertical disposition substantially flush an exterior side of said cart basket.

11. A shelf in accordance with claim 7 wherein the construction of said main body and of said projections is substantially that of metal wire grid.

12. A shelf in accordance with claim 7 wherein at least one said projection extending beyond said second linear edge is linearly retractable and extensible in a direction outward and inward from said main body.

13. A shelf in accordance with claim 7 wherein at least one said projection extending beyond said second linear edge is rotatably retractable and extensible in a direction outward and inward from said main body.

14. A shelf in accordance with claim 7 wherein at least two of said projections extending beyond said first linear edge possess an arcuate portion of suitable radius and sufficient length of curvature to comprise means of rotatable attachment to one said horizontal frame member such that said shelf possesses a pivot about said one horizontal frame member.

15. A shelf in accordance with claim 7 wherein said sum of said first distance and said body width and the sum of said second distance and said body width are each insufficient to exceed the distance between one said horizontal frame member of one of said plurality of pairs of horizontal frame members and any opposed horizontal frame member of another one of said plurality of pairs of horizontal frame members thus ensuring that in deployment of said shelf in the interior of a grocery cart basket wherein said first linear edge is in communication with one of said two opposed interior side walls of said grocery cart basket and at least two of said plurality of projections extending beyond said first linear edge is in communication with one said horizontal frame member along said one of two opposed interior side walls, each said projection extending beyond said second linear edge is of a length insufficient to enable communication with any said horizontal frame member along the opposed interior side of the cart basket except the horizontal frame member forming an opposed pair upon a single vertical elevation with the horizontal frame member possessing communication with at least two of said plurality of projections extending beyond said first linear edge.

16. A shelf intended for use in a particular manufacture of a standard four wheeled wire frame horizontally nesting grocery cart possessing a front vertical cart basket wall and two substantially opposed side vertical cart basket walls, a plurality of horizontal frame members upon a single vertical elevation including one said frame member disposed along said front vertical cart basket wall and one said frame member each disposed along each of said two substantially opposed side vertical cart basket walls, said shelf comprising a main body and support means;

said main body comprising a rigid, substantially planar structure possessing an exterior perimeter subtended by the dimensions of the interior perimeter upon a single vertical elevation of the basket of said particular manufacture of a standard grocery cart;

said support means comprising at least three projections each extending outwardly from said main body beyond said exterior perimeter, terminating in an end distal said main body, at least one said projection possessing an arcuate portion of suitable radius and sufficient length of curvature to comprise means of rotatable attachment to one said horizontal frame member along said front vertical wall of said cart basket, at least two said projections disposed in extensible opposition such that one each may rest upon and in communication with one said horizontal frame member disposed along each of said two substantially opposed side vertical cart walls, all three said frame members possessing a single vertical elevation;

said shelf thus possessing the capability of being positioned horizontally within a particular manufacture of grocery cart and being supported via said support means by at least three said horizontal frame members, such deployment of said shelf providing a horizontal division of a frontal portion of said grocery cart basket interior, a horizontal surface upon which goods may be placed possessing an elevation within said basket interior above and other than the floor of said basket and further possessing means of pivotable attachment to one said horizontal frame member disposed along said front vertical cart basket wall.

17. A shelf in accordance with claim 16 wherein at least one of said projections disposed in extensible opposition possesses linear attachment to said main body.

18. A shelf in accordance with claim 16 wherein at least one of said projections disposed in extensible opposition possesses rotatable attachment to said main body.

19. A shelf in accordance with claim 16 wherein at least one of said projections disposed in extensible opposition possesses a spring loaded attachment to said main body.

20. A shelf in accordance with claim 16 wherein the construction of said main body is substantially that of metal wire grid.

* * * * *